US005936501A

United States Patent [19]

Seino

[11] Patent Number: 5,936,501

[45] Date of Patent: Aug. 10, 1999

[54] ELECTROMAGNETIC COUPLING DEVICE WITH SURGE PROTECTION COMPONENT

[75] Inventor: Toshiteru Seino, Kiryu, Japan

[73] Assignee: Ogura Clutch Co., Ltd., Gunma, Japan

[21] Appl. No.: 08/896,093

[22] Filed: Jul. 17, 1997

[30] Foreign Application Priority Data

Jul. 23, 1996 [JP] Japan .................................... 8-193119

[51] Int. Cl.[6] ........................................ H01H 7/20

[52] U.S. Cl. ........................................ 335/289; 335/142

[58] Field of Search ................................ 335/296–299, 335/289, 142, 132, 202, 227, 228, 229, 78–86, 128; 336/90, 98, 99, 174–176

[56] References Cited

U.S. PATENT DOCUMENTS

| | | | |
|---|---|---|---|
| 4,181,393 | 1/1980 | Lill . | |
| 4,432,446 | 2/1984 | Okano et al. . | |
| 4,557,544 | 12/1985 | Esser . | |
| 4,897,758 | 1/1990 | Pick et al. | 361/104 |
| 4,935,713 | 6/1990 | Bekheet . | |
| 4,945,329 | 7/1990 | Sugihara et al. | 335/219 |
| 5,138,293 | 8/1992 | Ishimaru | 335/289 |
| 5,184,705 | 2/1993 | Sekiguchi et al. . | |
| 5,225,801 | 7/1993 | Ida et al. . | |
| 5,307,038 | 4/1994 | Ishimaru . | |
| 5,320,206 | 6/1994 | Maejima . | |
| 5,508,671 | 4/1996 | Takashi . | |

FOREIGN PATENT DOCUMENTS

| | | |
|---|---|---|
| 3816965 | 11/1989 | Germany . |
| 56-138529 | 10/1981 | Japan . |
| 57-51025 | 3/1982 | Japan . |
| 57-51026 | 3/1982 | Japan . |
| 59-13137 | 1/1984 | Japan . |
| 59-144825 | 8/1984 | Japan . |
| 63-12108 | 1/1988 | Japan . |
| 2-38105 | 10/1990 | Japan . |
| 7-127662 | 5/1995 | Japan . |
| 7-127663 | 5/1995 | Japan . |
| 7-301259 | 11/1995 | Japan . |

OTHER PUBLICATIONS

European Search Report, application No. EP 97 30 5509.

*Primary Examiner*—Lincoln Donovan
*Attorney, Agent, or Firm*—Sidley & Austin; Hugh A. Abrams

[57] ABSTRACT

An accommodation section 22 is disposed integrally with a coil bobbin 20. A winding start portion 4*a* and a winding end portion 4*b* of an excitation coil 4 are forced into the accommodation section 22, a diode 24 is accommodated, and they are electrically connected through two terminals 27A and 27B. Coil engagement grooves 30*a* and 30*b* into which the winding start portion 4*a* and the winding end portion 4*b* are fitted, lead engagement grooves 31*a* and 31*b* and terminal engagement grooves 32*a* and 32*b* into which the terminals 27A and 27B are fitted are made in the inner bottom surface of the accommodation section 22. The terminals 27A and 27B have grooves into which the winding start portion 4*a,* the winding end portion 4*b* and the leads 24*a* and 24*b* are fitted, respectively, and lead wires 26 on the power source side are connected, respectively.

16 Claims, 12 Drawing Sheets

42A 4c 43 41 4d 42B 2 20B 51a 51a 49a 46a 46b 40e 49b

ELECTROMAGNETIC COUPLING DEVICE WITH SURGE PROTECTION COMPONENT

BACKGROUND OF THE INVENTION

This invention relates to an electromagnetic coupling device which is used as a solenoid clutch for transmitting a turning torque or a solenoid brake for braking the turning torque. More particularly, the present invention relates to an electromagnetic coupling device having a built-in electric component for preventing damage of an electric circuit due to a surge voltage, breakage of a V belt when a rotary member on the output side is locked, and the like.

Friction type electromagnetic coupling devices in general, such as solenoid clutches, transmit or cut off the turning torque by passing the magnetic flux generated by the excitation of an excitation coil between a rotor and an armature disposed in such a manner that their friction surfaces are opposed to each other, and bringing the friction surfaces into and out of pressure contact with and from each other by the magnetic attraction and the repulsion of a flexible member against the magnetic attraction.

Among such electromagnetic coupling devices, a solenoid clutch fitted to a refrigeration compressor of an automobile, for example, has a different lead length depending on the kind or model of automobile. Therefore, one kind of yoke having a built-in excitation coil cannot be used as a common automobile component for a variety of automobiles, and this is disadvantageous from the aspects of design and stock management. Therefore, various electromagnetic coupling devices where the excitation coil is connected to the lead wire on the power source side outside the yoke by changing the design of the prior art structure, wherein the excitation coil and the lead wire on the power side are connected outside the yoke, have been proposed in the past (for example, Japanese Laid-Open Nos. 12108/1988 and 125322/1992 (corresponding to U.S. Pat. No. 5,138,293).

In the electromagnetic coupling devices of this kind, a large surge voltage develops across both ends of the excitation coil as soon as the supply of power to the excitation coil is cut off and causes damage of the contacts of a switch or an erroneous operation. Therefore, a diode is connected in parallel with the excitation coil so as to absorb the surge voltage by this diode (Japanese Utility Model Laid-Open No. 12732/1985 and Japanese Patent Laid-Open No. 125322/1992, for example).

The electromagnetic coupling device described in Japanese Patent Laid-Open No. 125322/1992 (hereinafter referred to as the "prior art invention 1") was proposed by the same applicant of the present invention. In this electromagnetic coupling device, a terminal accommodation section is formed integrally with a coil bobbin for accommodating an excitation coil, a winding start portion and a winding end portion of the excitation coil are led into this terminal accommodation section, and a diode is connected in parallel with the excitation coil. The winding start portion and the winding end portion of the excitation coil are forced into the slits of two fitting metals disposed inside the terminal accommodation section, and by partly removing the insulating coating and the two end portions are electrically connected to these fitting metals, respectively. A bent plate of a support metal is forced into each fitting metal and is electrically connected thereto, so that the excitation coil and the diode are connected in parallel.

In the electromagnetic coupling devices of this kind, if the rotary member on the output side does not rotate for some reason or other, heat generation occurs due to the slip between the friction surface of the rotor and the armature, and the V-belt stretched on the rotor is cut. Therefore, the rotor and the armature must be separated from each other by detecting heat generation as soon as possible and by cutting off the supply of power to the excitation coil. Japanese Patent Laid-Open No. 138529/1981 (hereinafter referred to as the "prior art invention 2") and Japanese Patent Laid-Open No. 51025/1982 (hereinafter referred to as the "prior art invention 3"), for example, propose an electromagnetic coupling device using a temperature fuse. In other words, in the solenoid clutch disclosed in the prior art invention 2, a notch is made in an outer peripheral edge of one of the flanges of a coil bobbin having the excitation coil wound thereon, and the winding start portion and the winding end portion of the excitation coil are led out from this notch. A notch is similarly made in the outside end of the other flange, an intermediate portion of the excitation coil is led out so as to form a deflection portion, the deflection portion is then cut and is used as fuse connection terminal sections, and the terminals of the temperature fuse are connected to these terminal sections by pressure-connection terminals so as to connect the temperature fuse in series with the excitation coil. This temperature fuse is fixed by a hook disposed on the other flange.

In the electromagnetic clutch disclosed in the prior art invention 3, a fuse holder section for holding the temperature fuse is formed on the outside surface of a coil bobbin for accommodating the excitation coil and this coil bobbin together with the temperature fuse is molded with a synthetic resin and is insulated from outside.

As described above, if the temperature fuse is connected to the excitation coil, the temperature fuse is fused by the heat generated by the slip between the rotor and the armature, so that the supply of power to the excitation coil can be cut off and breakage of the V-belt, etc, can be prevented in advance.

However, the prior art inventions 1, 2 and 3 described above involve the following problems. In other words, in the electromagnetic coupling device described in the prior art invention 1, the winding start portion and the winding end portion of the excitation coil are inserted through the slit of each fitting metal and electrically connected, each lead of the diode is connected in advance to the lead on the power source side and to the ground wire from the excitation coil by the support metal, and the bent portion of this support metal is forced into the fitting metal so as to electrically connect the support metal and the fitting metal, as described above. Therefore, two metal members of two kinds, that is, the support metals and the fitting metals, or four metal members in all, must be prepared. Therefore, the number of components is large, and the connection work of the excitation coil, the lead wire and the diode is troublesome and time-consuming, and the terminal accommodation section becomes great in size.

In the solenoid clutch described in the prior art invention 2, the excitation coil and the leads of the temperature fuse are connected in advance by the pressure-connection terminals and the fuse is clamped and fixed by the hook. Therefore, this prior art invention 2 involves the problem that the connection work of the temperature fuse and the excitation coil is troublesome and time-consuming.

In the solenoid clutch described in the prior art invention 3, the coil bobbin together with the temperature fuse is molded with synthetic resin. Therefore, it is necessary to inject the molten molding resin into the coil receiving groove of the yoke accommodating the coil bobbin and to cure the resin. Therefore, it takes a long time for the molding, and the productivity drops.

SUMMARY OF THE INVENTION

The present invention has been made so as to solve the problems described above and the object is to provide an electromagnetic coupling device such that only a smaller number of terminals are needed, the manufacturing cost is accordingly low, the excitation coil, lead wires on the power source side and an electric component are mutually connected easily, and the size of the accommodation section is small.

To accomplish the object described above, the present invention has a feature that the electromagnetic coupling device includes a coil bobbin disposed inside a ring-like groove of a yoke, for holding an excitation coil, an accommodation section disposed integrally with the coil bobbin, for accommodating an electric component and two terminals disposed inside the accommodation section, for electrically connecting the excitation coil and the electric component, wherein each of the terminals is U-shaped, grooves into which the end portions of the excitation coil and the leads of the electric components are fitted are made in two side plate sections of the terminal opposed to each other, and coil engagement grooves into which the end portions of the excitation coil are fitted, lead engagement grooves into which the leads of the electric component are fitted and terminal engagement grooves into which the side plate sections of the terminal are fitted are made in the inner bottom surface of the accommodation section.

In the invention, the electric component is a varistor and is connected in parallel with the excitation coil, and a lead wire on the power source side is connected to each terminal.

In the present invention, the electric component is a temperature fuse and is connected in series with the excitation coil.

In the present invention, the electric component is a heat-sensitive device and is connected in series with the excitation coil.

In the present invention, further, an engagement pawl for preventing come-off of the terminal from the terminal engagement groove is integrally formed on each side plate section of the terminal in such a manner as to protrude therefrom.

In the present invention, the terminal electrically connects the end portions of the excitation coil, the leads of the electric component and the lead wire on the power source side. The terminal is forced into the terminal engagement groove, and its come-off is prevented by the engagement pawl. When the supply of power to the excitation coil is cut off, the varistor absorbs the surge voltage induced across both ends of this excitation coil. The temperature fuse is fused by the heat generated by the rotor and resultantly stops the supply of power to the excitation coil. The heat-sensitive device undergoes deformation with the temperature rise and cuts off the circuit, thereby stopping the supply of power to the excitation coil.

BRIEF DESCRIPTION OF THE DRAWINGS

Hereinafter, an embodiment of the present invention will be explained in detail with reference to the accompanying drawings.

BRIEF DESCRIPTION OF THE DRAWINGS

Figure 1:
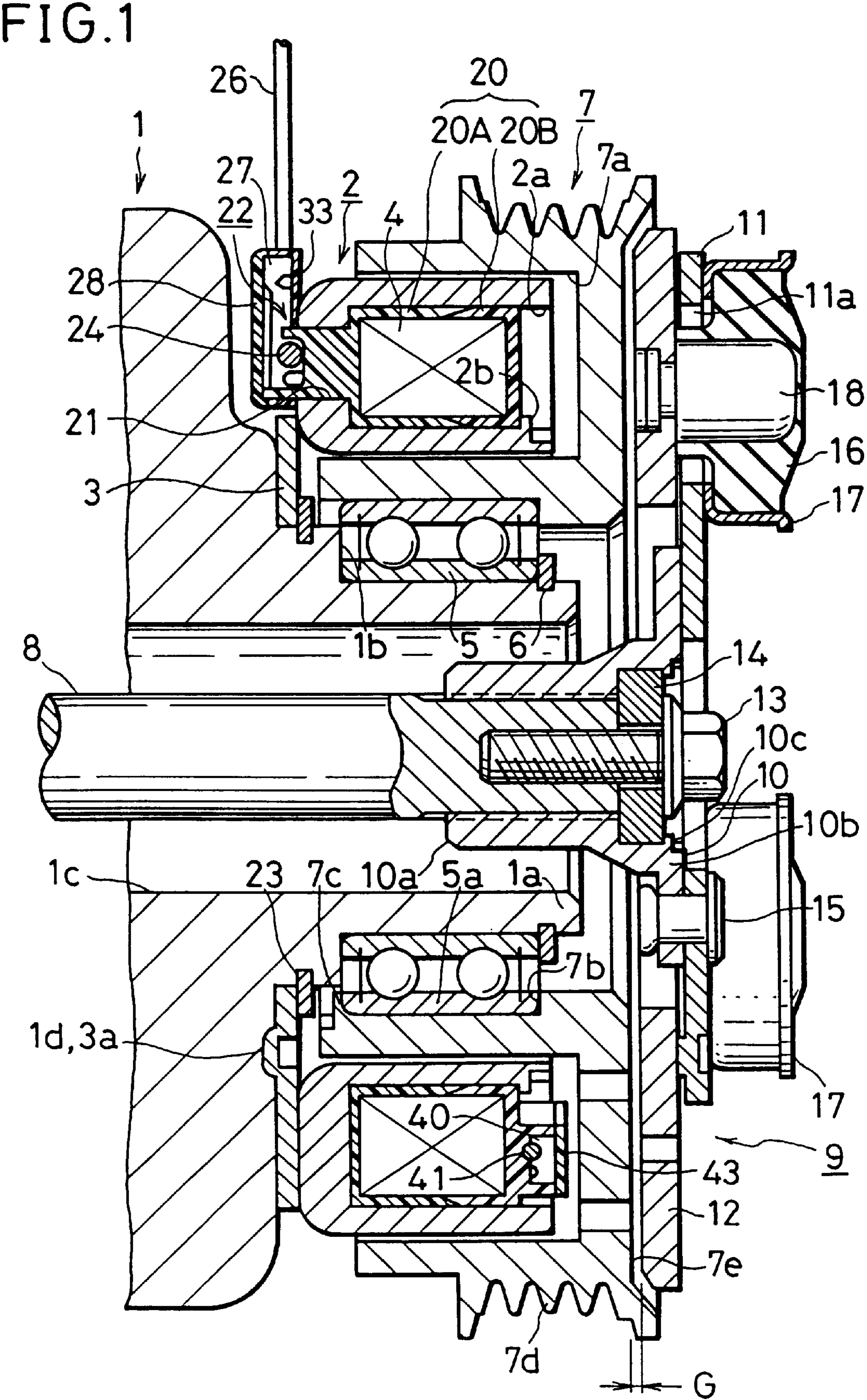
FIGS. 1 to 19 show an example of the application of the electromagnetic coupling device according to the present invention to a solenoid clutch of a refrigeration compressor of a car.

FIG. 1 is a sectional view of a solenoid clutch according to the present invention.

Figure 2:
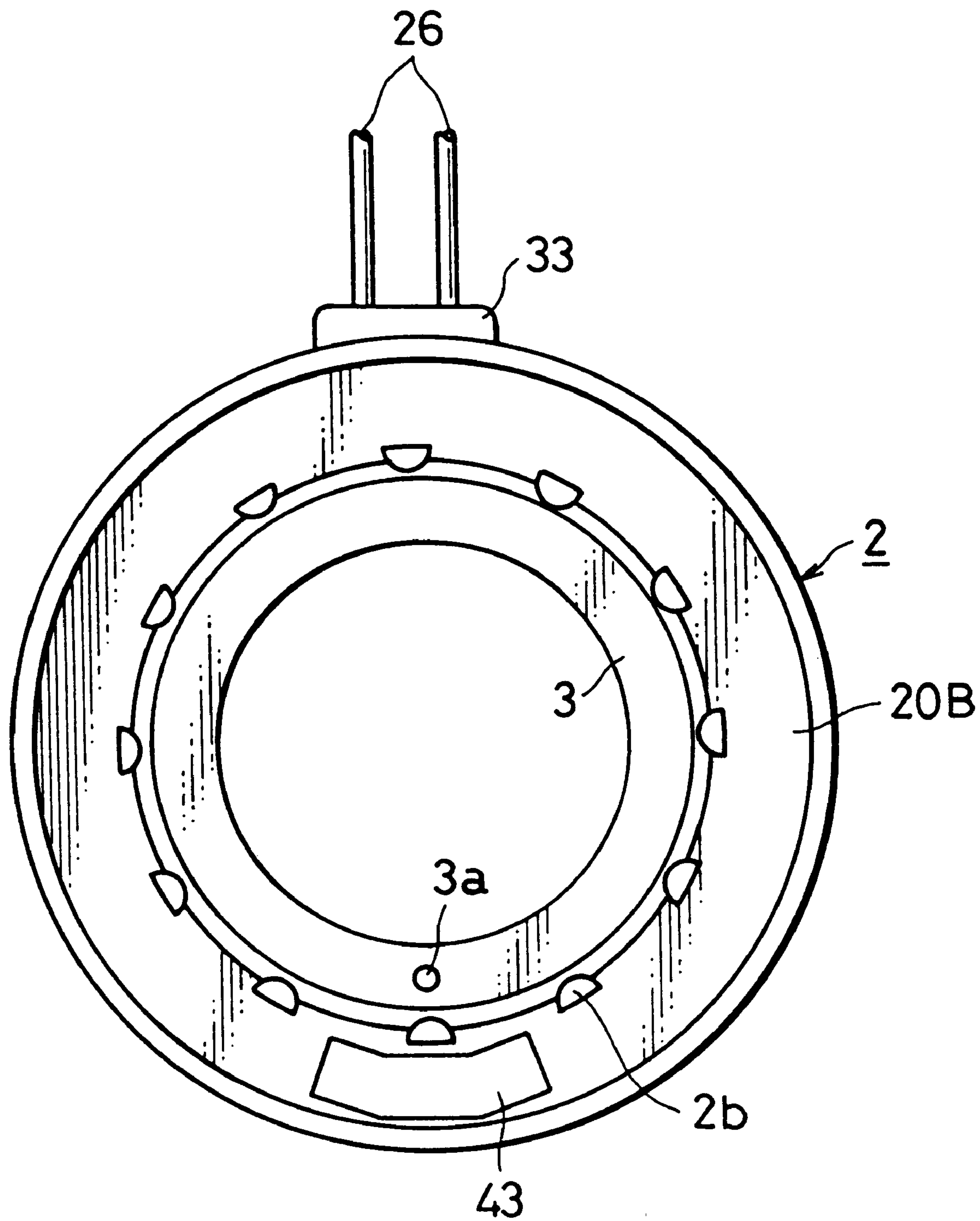

FIG. 2 is a front view of a yoke assembly.

Figure 3:
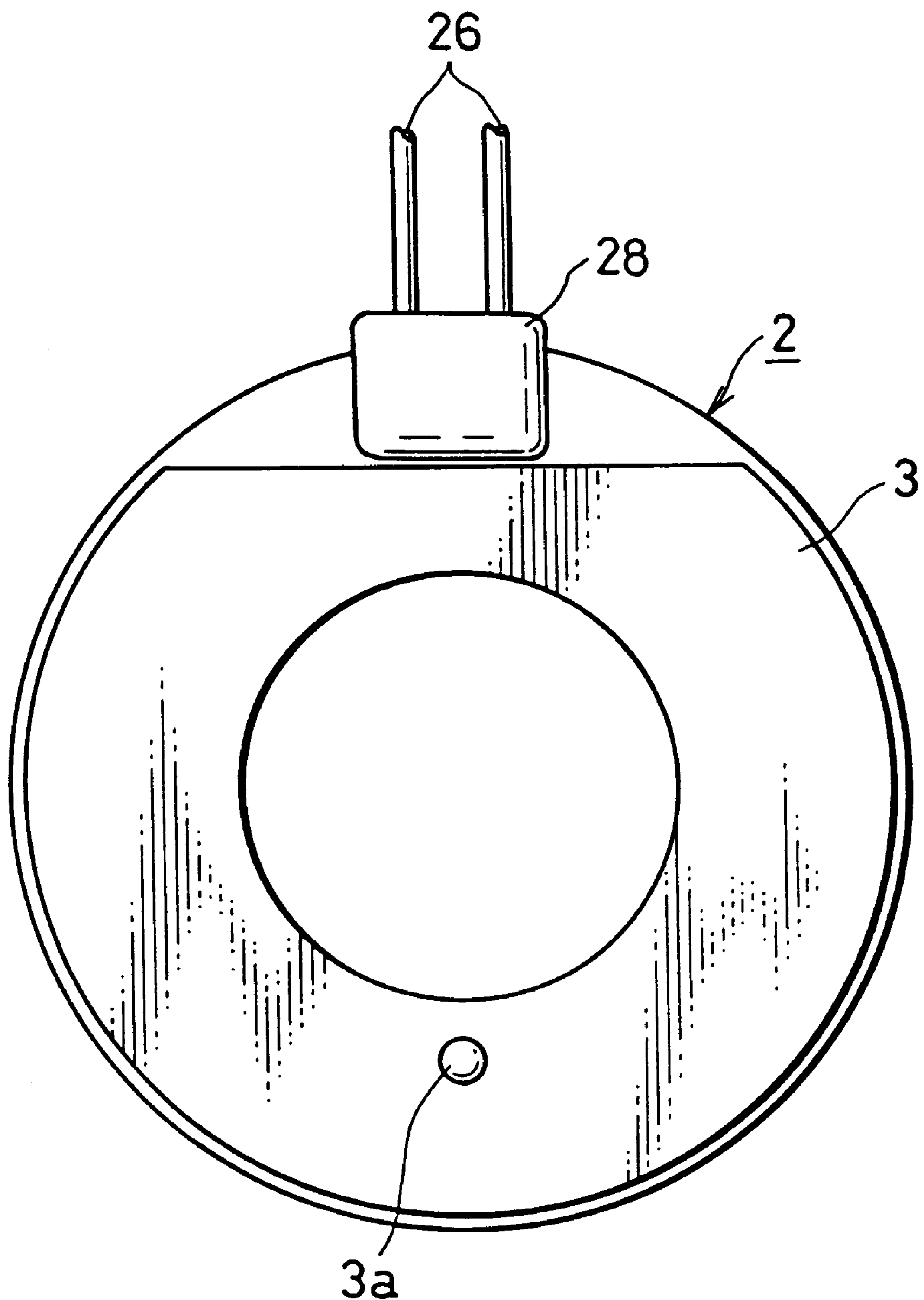

FIG. 3 is a back view of a yoke assembly.

Figure 4:
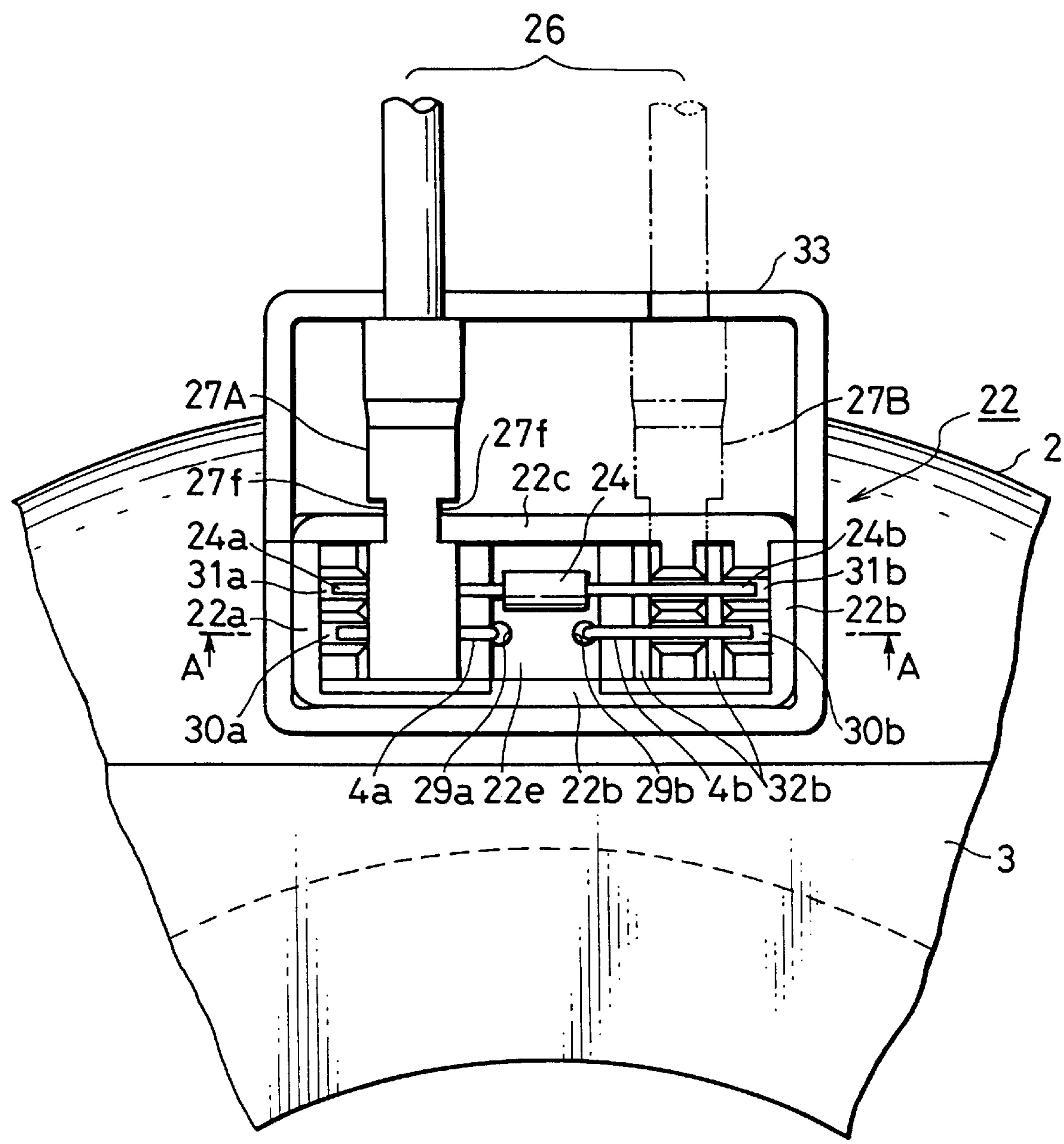

FIG. 4 is an enlarged view of the principal portions of FIG. 3.

Figure 5:
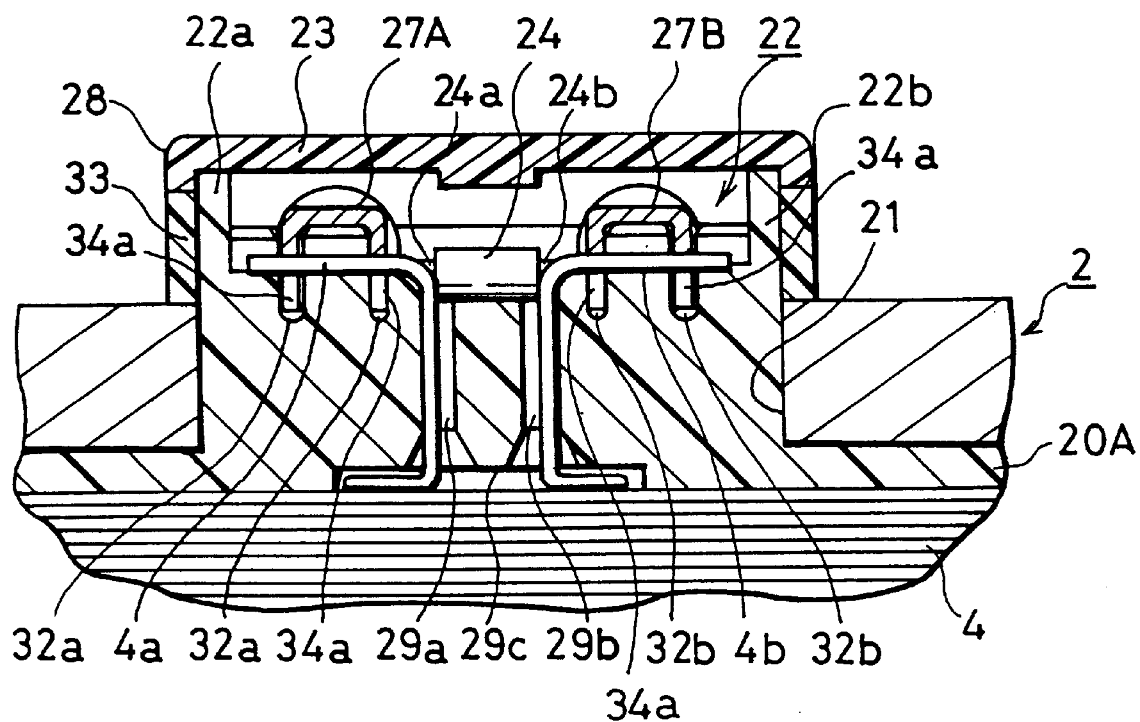

FIG. 5 is a sectional view taken along line A—A of FIG. 4.

Figure 6:
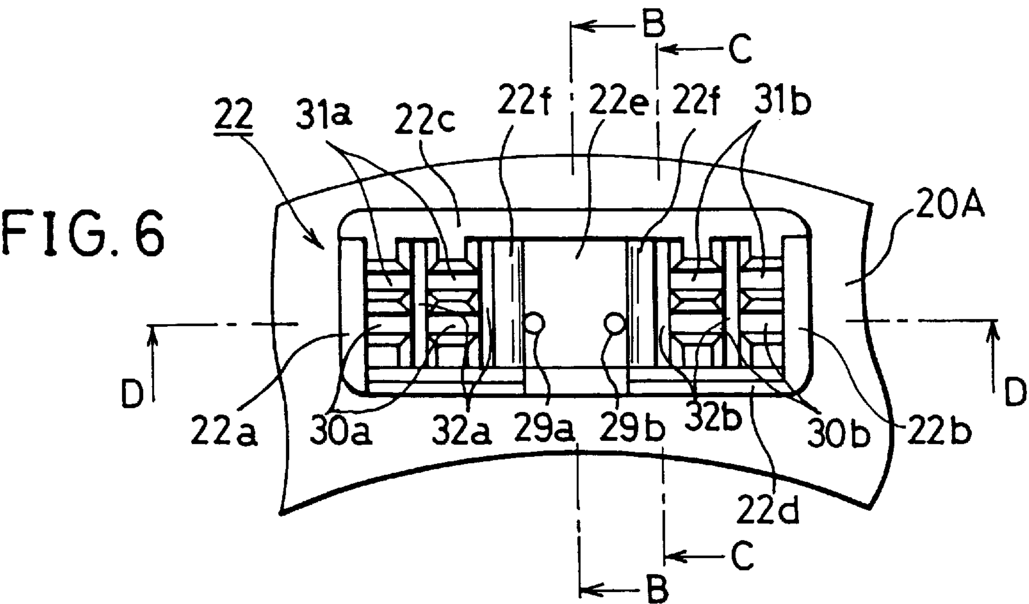

FIG. 6 is a plan view of an accommodation section of a bobbin main body.

Figure 7:
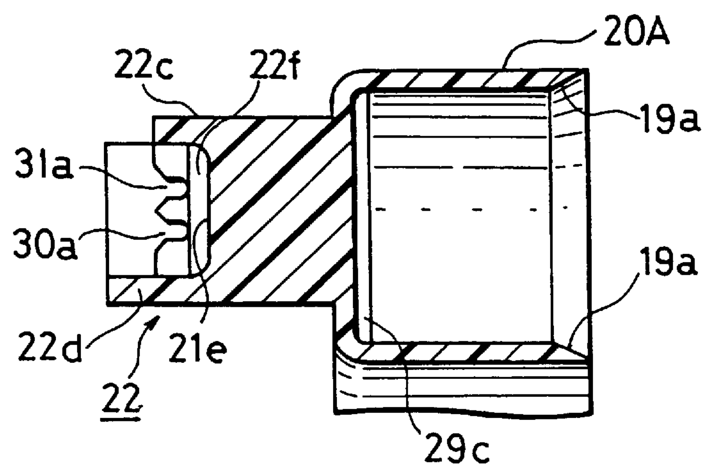

FIG. 7 is a sectional view taken along line B—B of FIG. 6.

Figure 8:
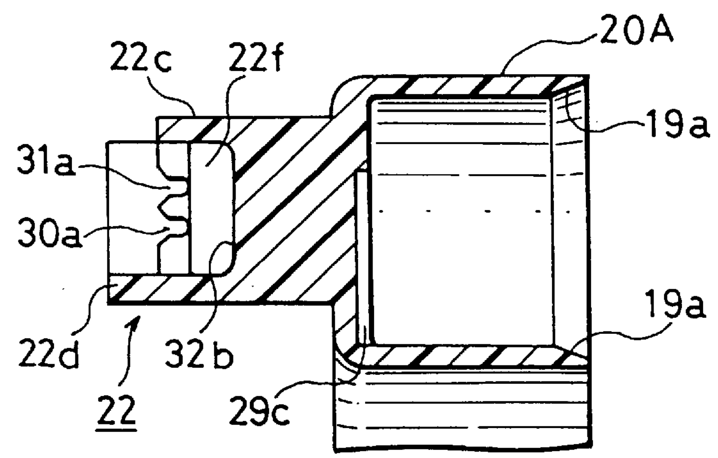

FIG. 8 is a sectional view taken along line C—C of FIG. 6.

Figure 9:
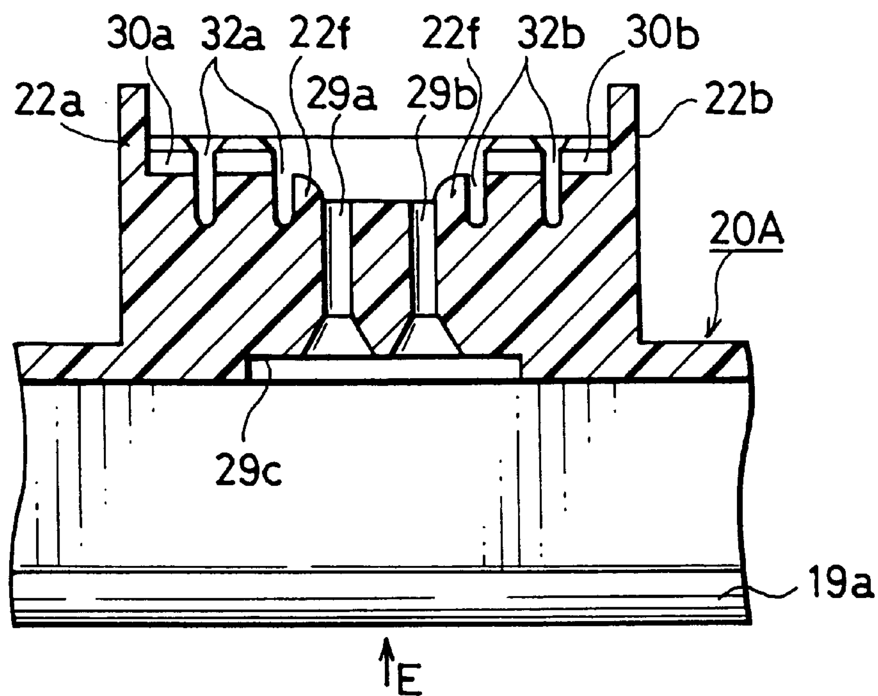

FIG. 9 is a sectional view taken along line D—D of FIG. 6.

Figure 10:
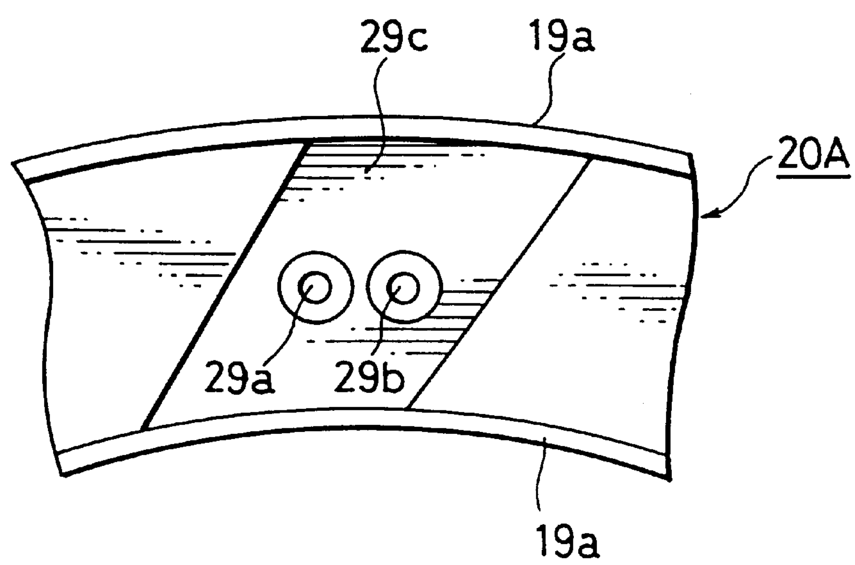

FIG. 10 is a perspective view when viewed from the direction indicated by arrow E of FIG. 9.

Figure 11:
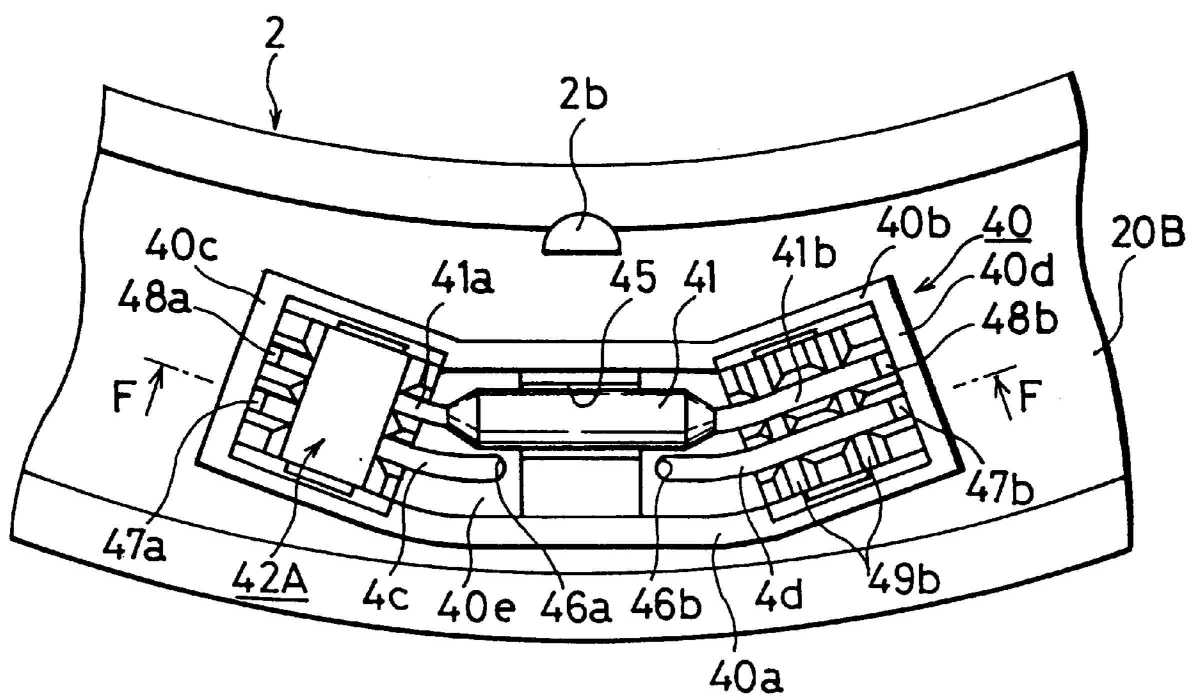

FIG. 11 is an enlarged view of the principal part of FIG. 2.

Figure 12:
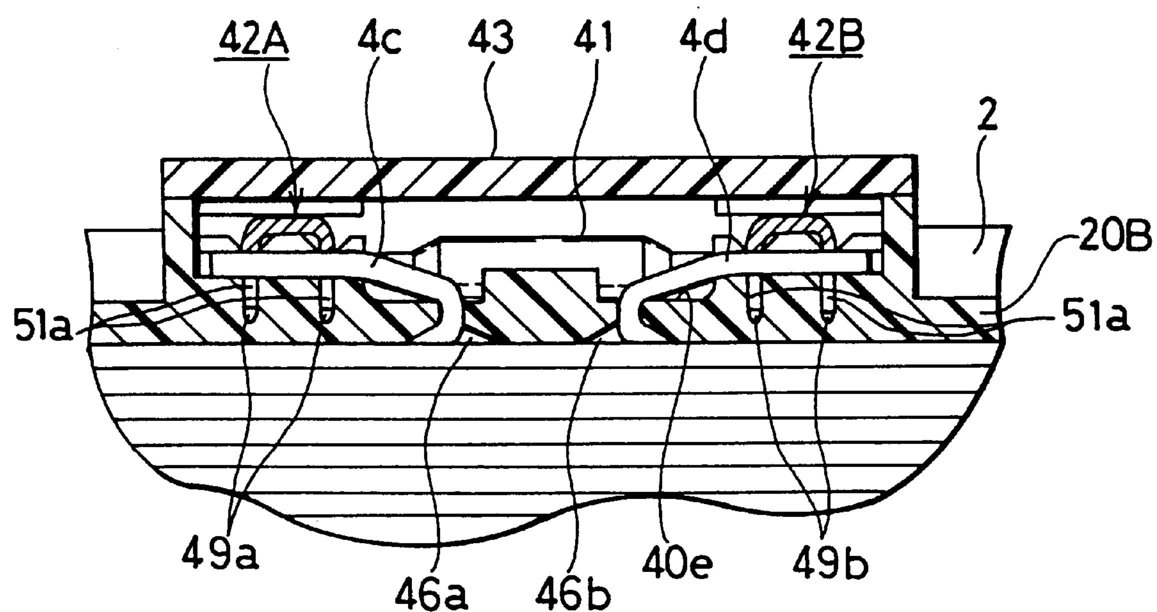

FIG. 12 is a sectional view taken along line F—F of FIG. 11.

Figure 13:
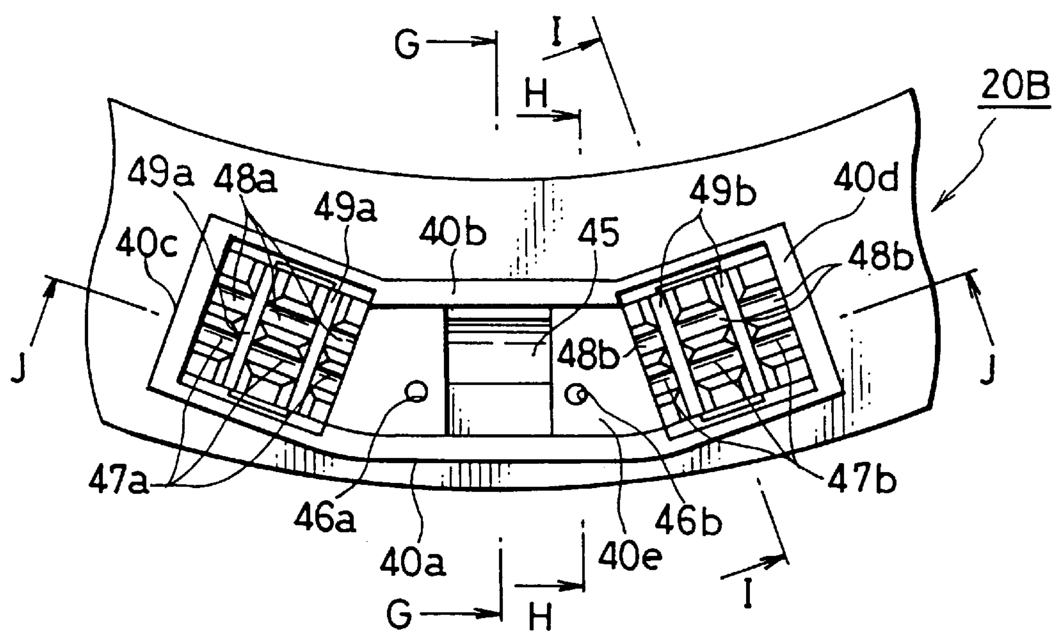

FIG. 13 is a plan view of the accommodation section of the coil cover.

Figure 14:
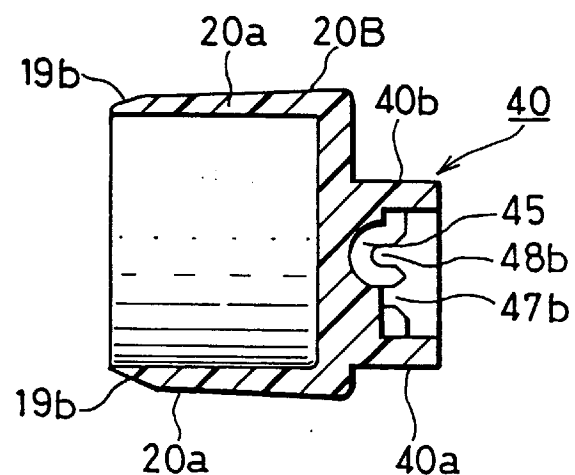

FIG. 14 is a sectional view taken along line G—G of FIG. 13.

Figure 15:
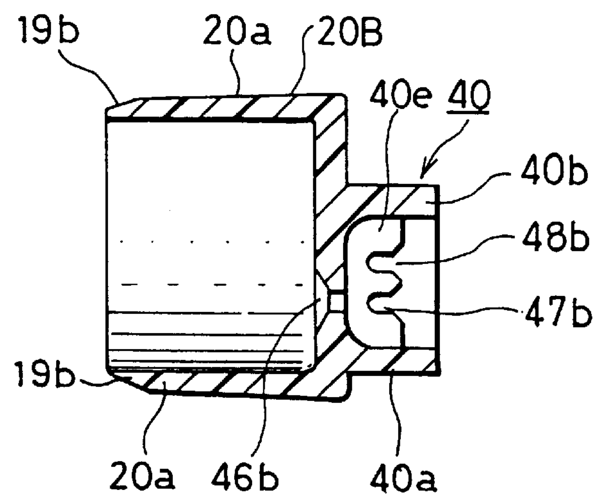

FIG. 15 is a sectional view taken along line H—H of FIG. 13.

Figure 16:
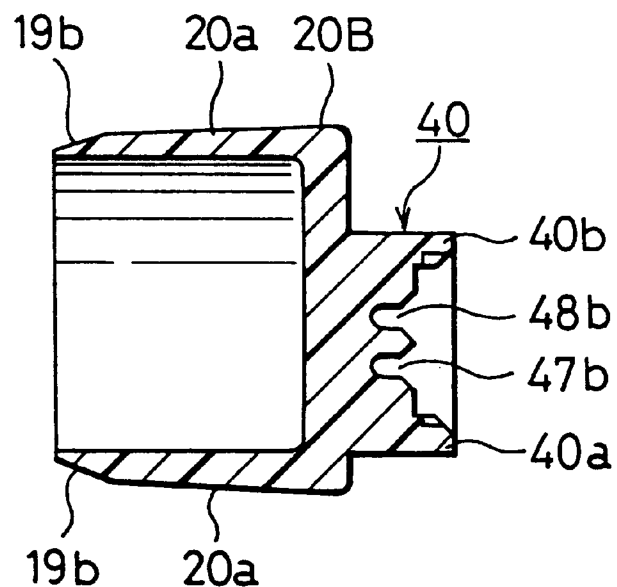

FIG. 16 is a sectional view taken along line I—I of FIG. 13.

Figure 17:
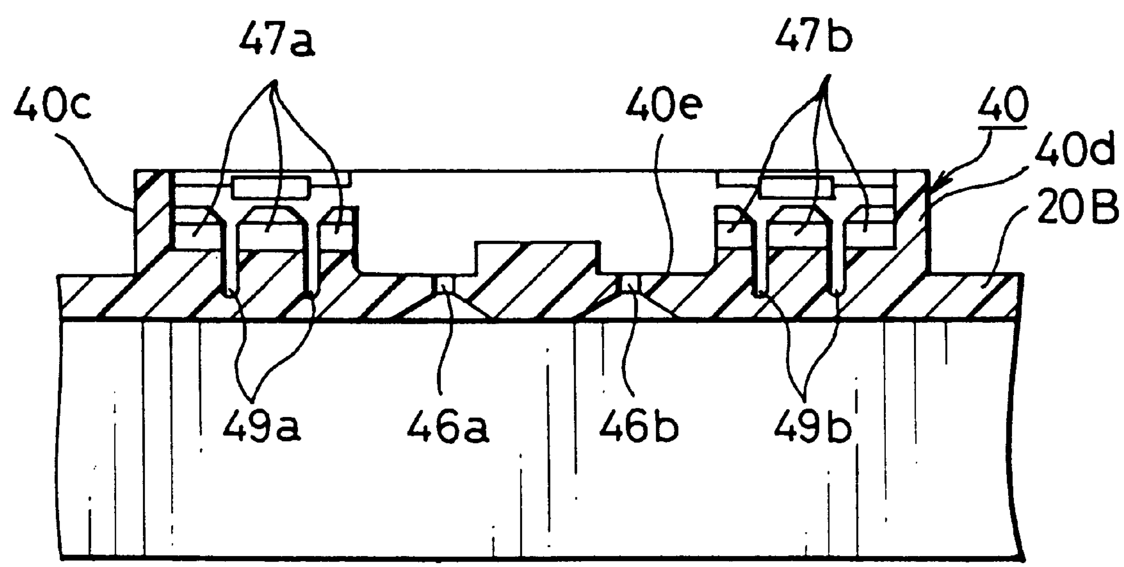

FIG. 17 is a sectional view taken along line J—J of FIG. 13.

Figure 18:
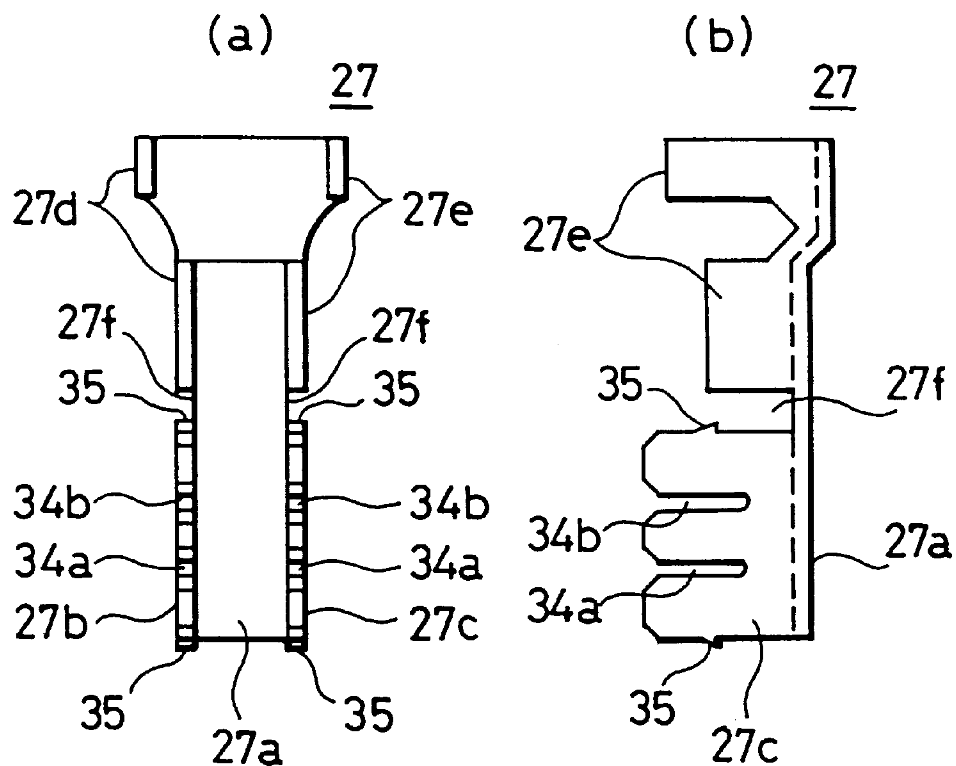

FIGS. 18(*a*) and (*b*) are a bottom view and a side view of the terminal.

Figure 19:
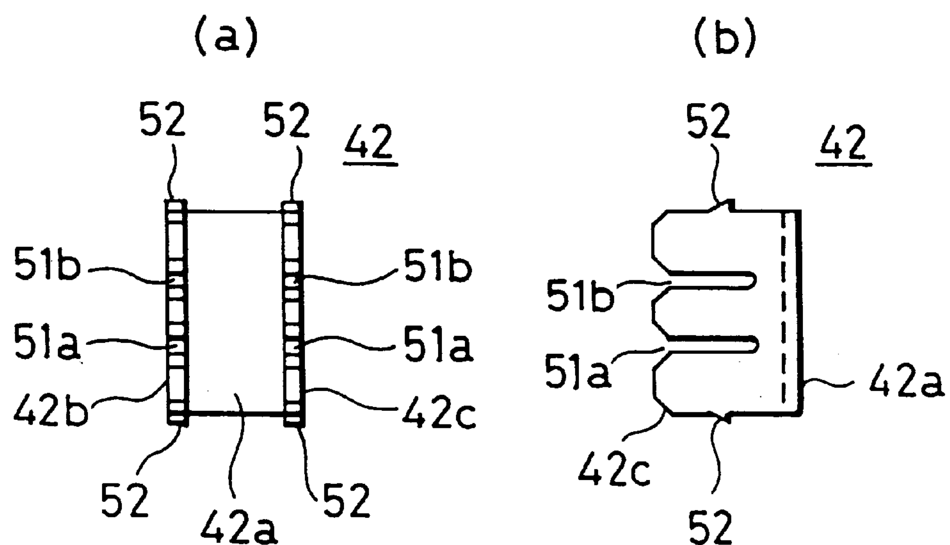

FIGS. 19(*a*) and (*b*) are a bottom view and a side view of the terminal.

DETAILED DESCRIPTION OF THE DRAWINGS

In FIG. 1, a yoke 2 formed into a ring-like body and having a U-shaped section at a part thereof in the circumferential direction is fixed to the outer periphery on the nose (1*a*) side of a compressor housing 1 through a support plate 3. The support plate 3 is positioned relative to the housing 1 by a recess 1*d* and a protuberance 3*a* and its movement in the axial direction is restricted by a retaining ring 23. A coil bobbin 20 for accommodating an excitation coil 4 comprising a self-weldable wire is fitted into a ring-like groove 2*a* of this yoke 2. A ball bearing 5 is fitted into the nose portion 1*a* of the housing 1, and a snap ring 6 and a step portion 1*b* of the housing 1 restrict the movement in the axial direction.

A ring-like rotor 7 having a ring-like groove 7*a* and a U-shaped section at a part thereof in the circumferential direction is forced into the outer race 5*a* of the ball bearing 5, and the step portion 7*b* and a plurality of caulking plates 7*c* restrict the movement in the axial direction. A plurality of V-shaped grooves 7*d* are made round the outer periphery of the rotor 7, and the rotation on the driving side is transmitted to the rotor through a V belt, not shown, which is stretched between the V-shaped grooves 7*d* and a driving source such as a car engine.

A rotary shaft 8 is provided through a center hole 1*c* of the housing. This rotary shaft 8 is rotatably supported by a bearing, not shown, on the housing (1)side and protrudes outside from the nose portion 1*a*. An armature assembly 9 as a rotary member on the output side is fitted to the distal end of this protruding portion.

The armature assembly 9 comprises an armature hub 10, a stopper plate 11, an armature 12, and associated components. The armature hub 10 comprises a boss 10*a* and a flange 10*b* formed integrally with this boss 10*a*. The boss 10*a* is spline-coupled with the distal end of the protruding portion of the rotary shaft 8 and is fixed with a bolt 13 and a doubling plate 14.

The doubling plate 14 is prevented from coming off by a plurality of caulking plates 10*c* provided to the boss 10*a*. The stopper plate 11 described above is fixed to the outside surface of the flange 10*b* with a Plurality of headed rivets 15. This stopper plate 11 is formed by punching out a steel sheet into a substantial triangle when viewed from the front. A round through-hole 11*a* is bored at each vertex and at the same time, a damper cover 17 for accommodating a damper rubber 16 is welded to each vertex.

The afore-mentioned armature 12 is fitted to the inside surface of the stopper plate 11. This armature 12 is fitted to the stopper plate 11 through the rivet 18 and the damper rubber 16 and is opposed to a friction surface 7*e* of the rotor 7 with a small gap G between them.

The coil bobbin 20 for accommodating the excitation coil 4 comprises two members, that is, a bobbin main body 20A and a coil cover 20B, each of which is molded with a synthetic resin into a ring-like body so that a part thereof in the peripheral direction has a U-shaped section and whose opening is bonded to that of the other. These members 20A and 20B cover the excitation coil 4 and shield it from outside. The coil bobbin 20 is fitted into the ring-like groove 2*a* of the yoke 2 and is prevented from coming off from the ring-like groove 2*a* by a plurality of caulking plates 2*b*. As shown in FIGS. 7, 8, 14 and 15, the joint surfaces of the bobbin main body 20A and the coil cover 20B are formed into taper surfaces 19*a* and 19*b* that incline at the same angle but in mutually opposite directions. When the caulking plates 2*b* are fastened, these taper surfaces are tightly fitted to each other by the wedge action, further reinforce fixing of the excitation coil 4 and completely shield the excitation coil 4 from outside. The outer peripheral surface 20*a* of the coil cover 20B is shaped into a slope that inclines towards the opening of the coil cover 20B and is forced into the ring-like groove 2*a* of the yoke 2.

A rectangular hole 21 through the bottom plate of the yoke 2 is bored at one position of the yoke 2, into which such a coil bobbin 20 is fitted, in the circumferential direction, and the accommodation section 22 formed integrally and protrusively from the outside surface of the bobbin main body 20A protrudes from this hole 21 to the outside of the yoke 2. As shown in FIGS. 4 to 10, this accommodation section 22 is constituted into a rectangular frame body extended in the circumferential direction of the bobbin main body 20A by four side plates 22*a* to 22*d*. A silicon diffused junction diode 24 as a varistor for absorbing a surge voltage that develops when the supply of the current to the excitation coil 4 is cut off is accommodated inside this frame body. Two terminals 27 (27A and 27B) having the same structure for connecting electrically this diode 24, the excitation coil 4 and lead wires 26 on the power source side are also accommodated in the frame body, and are covered with a terminal cover 28. The terminal cover 28 is fixed to the accommodation section 22 by ultrasonic fusing, or the like, in such a manner as to cover the frame body comprising the side plates 22*a* to 22*d* and the terminals 27A and 27B. A spacer 33 is fitted to the outer periphery of the accommodation section 22 and is fixed to it by ultrasonic welding, or the like. Among the four side plates 22*a* to 22*d*, three side plates 22*a*, 22*b* and 22*d* have the same height but are higher than the side plate 22*c* on the external side. An engagement groove 27*f* of the terminals 27A and 27B is engaged with the side plate 22*c*, and the lead wire 26 on the power source side is clamped between the terminal cover 28 and the spacer 33.

The center portion of the inner bottom surface 22*e* of the accommodation section 22 in the longitudinal direction is so formed as to be lower than both of its side portions, functions as the support surface of the diode 24 described above, and has two coil lead-out holes 29*a* and 29*b* communicating with the inside of the bobbin main body 20A. As shown in FIGS. 4 and 6, these coil lead-out holes 29*a* and 29*b* are provided on one of the sides of the diode 24 and are spaced apart in the peripheral direction of the bobbin main body 20A. A winding start portion 4*a* and a winding end portion 4*b* of the excitation coil 4 are inserted through, and led out from these coil lead-out holes 29*a* and 29*b*, respectively. A groove 29*c* for leading out the coil is made in the portion on the inner surface side of the bobbin main body 20A, where the coil lead-out holes 29*a* and 29*b* are made, as shown in FIGS. 9 and 10.

Two grooves 30*a* and 30*b* into which the winding start portion and the winding end portion 4*b* of the excitation coil 4 are fitted, respectively, two grooves 31*a* and 31*b* into which the leads 24*a* and 24*b* of the diode 24 are fitted, respectively, and two grooves 32*a* and 32*b* into which the terminals 27A and 27B are forced, are made on both sides of the inner bottom surface 22*e* of the accommodation section 22. The grooves 30*a*, 30*b* for fitting the coil and the grooves 31*a*, 31*b* for fitting the lead are parallel to one another and are extended in the circumferential direction of the bobbin main body 20A. Each of the grooves 32*a* and 32*b* for fitting the two terminals comprises two grooves which are parallel to each other and is extended in the radial direction of the bobbin main body 20 in such a manner as to perpendicularly cross the grooves 30*a* and 30*b* for fitting the coil and the grooves 31*a* and 31*b* for fitting the leads. The upper surface of the step portion 22*f* that partitions the center portion of the inner bottom surface 22*e* of the accommodation section 22 from both side portions is curved arcuately as shown in FIG. 9, and the winding start portion 4*a* and the winding end portion 4*b* of the coil 4 are so bent as to extend along this arcuate step portion 22*f* and to be fitted into the grooves 30*a* and 30*b* for fitting the coil.

The terminal 27 is so formed by bending a conductive metal plate such as of copper, brass, etc, that the section has a U shape as shown in FIG. 18. The terminal 27 includes integrally an oblong main body 27*a*, two side plate sections 27*b* and 27*c* so formed contiguously to one of the ends of the main body 27*a* as to be opposed to each other, and two side plate sections 27*d* and 27*e* so formed contiguously to the other end of the main body 27*a* as to be opposed to each other. Engagement grooves 27*f* are made between the side plate section 27*b* and the side plate section 27*d* and between the side plate section 27*c* and the side plate section 27*e*. Two grooves 34*a* and 34*b* into which each end portion (4*a*, 4*b*) of the excitation coil 4 and each lead 24*a*, 24*b* of the diode 24 are fitted are made in the end surface of each side plate section 27*b*, 27*c*, and a triangular engagement pawl 35 is formed integrally at each end in such a manner as to protrude therefrom. The grooves 34*a* into which the winding start portion 4*a* and the winding end portion 4*b* of the excitation coil 4 are fitted have edge shapes at their groove ends. When the groove end is shaped into an edge, the winding start and end edge portions break through the insulating film such as an enamel film insulating and covering the coil core wire and are clamped in the coil core wires when the winding start and end portions 4*a,* 4*b* are fitted, so that the coil core wires and the terminal 27 can be connected more reliably. Incidentally, the leads 24*a* and 24*b* of the diode 24 are not generally coated for insulation. Therefore, the groove end of the groove 34*b* need not be shaped into an edge. When the side plate sections 27*b* and 27*c* are fitted into the grooves 32*a* and 32*b* for fitting the terminal, the engagement pawl 35 is between into the groove walls of the grooves 32*a* and 32*b* for fitting the terminal and prevents come-off of the terminal 27. When the engagement pawl 35 abuts on the groove wall, the side plate sections 27*b* and 27*c* are compressed and narrow the grooves 34*a* and 34*b*. In consequence, the terminal 27 can be connected more reliably to the excitation coil 4 and the diode 24.

The end portion of the core wire of the lead wire 26 on the power source side is extended along the lower surface of the main body 27*a* and is fitted between the side plate sections 27*d* and 27*e,* and when these side plate sections 27*d* and 27*e* are bent inward, they clamp the insulating portion of the lead wire 26 on the power source side, so that the lead wire 26 is fixed to the terminal 27 and is electrically connected thereto.

To electrically connect the excitation coil 4, the diode 24 and the lead wire 26 on the power source side, the lead wires 26 on the positive and negative sides of the power source are connected in advance to the terminals 27A and 27B. The winding start portion 4*a* and the winding end portion of the excitation coil 4 led out from the coil lead-out holes 29*a* and 29*b* are bent outward and are fitted into the grooves 30*a* and 30*b* for fitting the coil, respectively. The leads 24*a* and 24*b* of the diode 24 are fitted into the lead fitting grooves 31*a* and 31*b*. Next, the grooves 34*a* and 34*b* of the terminals 27A and 27B are brought into alignment with the grooves 30*a,* 30*b* for fitting the coil and the grooves 31*a,* 31*b* for fitting the leads, and the side plate sections 27*b* and 27*c* are fitted into the grooves 32*a* and 32*b* for fitting the terminals in order. In this way, the winding start portion 4*a* and the winding end portion 4*b* of the excitation coil 4 are inserted into the coil grooves 34*a* for the terminals 27A and 278, and are electrically connected to these terminals. At the same time, the leads 24*a* and 24*b* of the diode 24 are fitted into the grooves 34*b* for the leads of the terminals 27A and 27B and are electrically connected to these terminals. As a result, the diode 24 is connected in parallel with the excitation coil 4. When the diode 24 is connected in parallel with the excitation coil 4 in this way, the surge voltage that develops when the supply of power to the excitation coil 4 is cut off can be absorbed.

As shown in FIGS. 1, 2, 11 to 17 and 19, an accommodation section 40 for accommodating a temperature fuse 41 and two terminals 42 (42A and 42B) for connecting this temperature fuse 41 in parallel with the excitation coil 4 is integrally formed at one position of the outside surface of the coil cover 20B constituting the coil bobbin 20 in its circumferential direction. This accommodation section 40 is constituted into a deformed rectangular frame body extended in the circumferential direction of the coil cover 20B by four side plates 40*a* to 40*d,* and is covered with a fuse cover 43. After the temperature fuse 41 is accommodated inside the accommodation section 40 and is connected to the excitation coil 4, the fuse cover 43 is fused by ultrasonic fusing, or the like. The accommodation section 40 is disposed at a position deviated by about 180° from the accommodation section 22 of the diode 24 in the circumferential direction.

A fuse accommodation groove 45 for accommodating the temperature fuse 41 described above and two coil lead-out holes 46*a* and 46*b* are made at the center of the inner bottom surface 40*e* of the accommodation section 40 in its longitudinal direction. The fuse accommodation groove 45 is extended in the longitudinal direction of the accommodation section 40 and restricts the movement of the temperature fuse 41 in the radial direction of the coil cover 20B. The coil lead-out holes 46*a* and 46*b* are positioned on one of the sides of the temperature fuse 41 and are spaced apart from each other in the longitudinal direction of the fuse accommodation groove 45. Further, they communicate with the inside of the coil cover 20B. Two cut end portions 4*c* and 4*d* formed at intermediate portions of the excitation coil 4 are inserted into and led out from these coil-lead out holes 46*a* and 46*b,* and these cut end portions 4*c* and 4*d* are connected to the leads 41*a* and 41*b* of the temperature fuse 41 by the terminals 42A and 42B, respectively. In consequence, the excitation coil 4 and the temperature fuse 41 are connected in series.

After the cut end portions 4*c* and 4*d* are formed, the excitation coil 4 is assembled into the coil bobbin 20. In other words, a deflection portion is formed while the coil is being wound, and is cut at its center so as to form the two cut end portions 4*c* and 4*d*. The coil is further wound to form the excitation coil 4. The cut end portions 4*c* and 4*d* are exposed to one of the side surfaces of the excitation coil 4 in this state. Next, the excitation coil 4 so wound up is fitted into the bobbin main body 20A. After the winding start portion 4*a* and the winding end portion 4*b* are led into the accommodation section 22 through the coil lead-out holes 29*a* and 29*b,* the coil cover 20B is put on the portion of the excitation coil 4 protruding from the bobbin main body 20A. At this time, the cut end portions 4*c* and 4*d* are led into the accommodation section 40 through the coil lead-out holes 46*a* and 46*b*. Thereafter, the coil bobbin 20 is fitted into the ring-like groove 2*a* of the yoke 2 to constitute the yoke assembly, and is fixed to the housing 1.

Both sides of the inner bottom surface 40*e* of the accommodation section 40 are so shaped as to be higher than the center portion, and two coil engagement grooves 47*a* and 47*b* into which the cut end portions 4*c* and 4*d* are fitted, two lead engagement grooves 48*a* and 48*b* into which the leads 41*a* and 41*b* of the temperature fuse 41 are fitted and two terminal grooves 49*a* and 49*b* into which the terminals 42A and 42B are fitted are made in the both sides of the inner bottom surface 40*e*. The coil engagement grooves 47*a,* 47*b* and the lead engagement grooves 48*a,* 48*b* are parallel to one another and are extended in the circumferential direction of the coil cover 20B. Each of the two terminal engagement grooves 49*a* and 49*b* comprises two mutually parallel grooves and are provided in the radial direction of the coil cover 20B in such a manner as to perpendicularly cross the lead engagement grooves 48*a* and 48*b*.

The terminal 42 is formed by bending a conductive metal plate such as of copper or brass, so that its section has a U-shape like the terminal 27, as shown in FIG. 19, and integrally includes an oblong main body 42*a* and two side plate sections 42*b* and 42*c* that are contiguous to both side edges of the main body 42*a* and opposed to each other. Two grooves 51*a* and 51*b* into which the cut end portion 4*c,* 4*d* of the excitation coil 4 and the lead 41*a,* 41*b* of the temperature fuse 41 are fitted are made in the distal end surface of each of the side plate sections 42*b* and 42*c,* and a triangular engagement pawl 52 is integrally formed on each of the side edges. The groove end of the groove 51*a* of the terminal 42 is shaped into an edge like the groove 34*a* of the terminal 27 described already so that when each cut end portion 4*c*, 4*d* of the excitation coil 4 is fitted, the edge breaks through the insulating film such as enamel covering and insulating the coil core wire and electrically connects the coil core wire to the terminal 42. Incidentally, because the leads 41*a* and 41*b* of the temperature fuse 41 are not generally insulated and coated similarly to the leads 24*a* and 24*b* of the diode 24 described above, the groove end need not be shaped into an edge by merely setting the groove width of the groove 51*b* to be somewhat smaller than the coil diameter. The engagement pawl 52 is caught between the groove wall of each terminal engagement groove when each side plate section 42*b*, 42*c* is forced into the terminal engagement groove 49*a*, 49*b*, and prevents come-off of the terminal 42.

To electrically connect the excitation coil 4 to the temperature fuse 41, the cut end portions 4*c* and 4*d* of the excitation coil 4 are bent and are fitted into the coil engagement grooves 47*a* and 47*b*, respectively. The leads 41*a* and 41*b* of the temperature fuse 41 are fitted into the lead engagement grooves 48*a* and 48*b*, respectively. Next, the grooves 51*a* and 51*b* of the terminals 42A and 42B are brought into alignment with the coil engagement grooves 47*a* and 47*b* and with the lead engagement grooves 48*a* and 48*b*, and the side plate sections 42*b* and 42*c* of the terminals 42A and 42B are serially forced into the terminal engagement grooves 49*a* and 49*b*, respectively. In this way, the cut end portions 4*c* and 4*d* of the excitation coil 4 are fitted into the coil grooves 51*a* of the terminals 42A and 42B and are electrically connected to these terminals 42. The leads 41*a* and 41*b* of the temperature fuse 41 are likewise fitted into the lead grooves 51*b* of the terminals 42A and 42B and are electrically connected to these terminals 42. As a result, the temperature fuse 41 connected the cut end portions 4*c* and 4*d* of the excitation coil 4 and is connected in series with this coil 4. When the side plate sections 42*b* and 42*c* are forced into the terminal engagement grooves 49*a* and 49*b*, the engagement pawl 52 is bitten between the groove wall of the terminal engagement grooves 49*a* and 49*b*. Therefore, the terminals 42A and 42B do not come off from the terminal engagement grooves 49*a* and 49*b*.

Incidentally, this embodiment is an example where the temperature fuse 41 is used as a protective device of the solenoid clutch when the rotary shaft 8 of the compressor is locked, and the supply of power to the excitation coil 4 is cut off as the temperature fuse 41 is fused by the heat. However, this example is not particularly limitative and it is also possible to dispose a switch which cuts off the supply of power to the excitation coil 4 by using a heat-sensitive device such as a bimetal whose shape changes with the temperature rise. Though this embodiment uses a silicon diffused junction diode as the varistor for absorbing the surge voltage, another surge voltage absorption component may be used, as well.

When the rotor 7 is driven from the prime mover side and is rotating on the nose portion 1*a* of the housing 1 in the solenoid clutch having the construction described above, the armature coil 12 is magnetically attracted to the friction surface 7*e* of the rotor 7 when the excitation coil 4 is excited by the supply of power. In other words, when the excitation coil 4 is excited, a magnetic circuit is so formed as to extend from the yoke 2 to the external poles of the rotor 7 and then through the armature, and to return to the yoke 2 through the internal poles of the yoke 2. Therefore, the armature 12 is attracted to the rotor 7 against the elastic repulsion of the damper rubber 16. As a result, the armature 12 rotates integrally with the rotor 7, the rotary shaft 8 which is integrated with the armature 12 rotates and the air compressor is operated. When the supply of power to the excitation coil 4 is cut off, the armature 12 is separated from the rotor 7 by the elastic repulsion of the damper rubber 16 and returns to the original position shown in FIG. 1, so that the transmission of revolution is cut off and the rotation of the rotary shaft 8 stops.

Incidentally, when the damper rubber 16 is used, the attraction sound when the armature 12 is magnetically attracted to the rotor 7 is reduced and moreover, the impact is mitigated, too.

In the solenoid clutch having the construction described above, the winding start portion 4*a* and the winding end portion 4*b* of the excitation coil 4 are led out in advance into the accommodation section 22 provided on the outside surface of the bobbin main body 20A and are fitted into the coil engagement grooves 30*a* and 30*b*, respectively. Similarly, the leads 24*a* and 24*b* of the diode 24 are fitted in advance into the lead engagement grooves 31*a* and 31*b*. When the two terminals 27 (27A and 27B) are fitted into the terminal engagement grooves 32*a* and 32*b* in order in this state, respectively, the winding start portion 4*a* and the winding end portion 4*b* of the excitation coil 4 can be electrically connected to the leads 24*a* and 24*b* of the diode 4, respectively. Therefore, the connection work between the excitation coil 4 and the diode 24 can be easily carried out without the necessity for soldering. When the winding start portion 4*a* and the winding end portion 4*b* of the excitation coil 4 are fitted into the coil grooves 34*a* of the terminal 27, the groove end of the groove 34*a* shaped into an edge bites into the insulating film insulating and covering the coil core wire. Therefore, it is not necessary to remove in advance the insulating film, and the coil core wire and the terminal 27 can be reliably connected. Since the terminal 27 is equipped integrally with the engagement pawl 35, it does not come off from the terminal engagement groove 32*a*, 32*b*.

Furthermore, the kind and the number of the terminals 27 can be reduced in comparison with the aforementioned prior art invention 1. Therefore, the size of the accommodation section 22 can be economically reduced.

Further, the cut end portions 4*c* and 4*d* of the excitation coil 4 are forced in advance into the accommodation section 40 of the coil cover 20B and are fitted into the coil engagement grooves 47*a* and 47*b*, and the leads 41*a* and 41*b* of the temperature fuse 41 are in advance fitted into the lead engagement grooves 48*a* and 48*b*. In this state, the two terminals 42 (42A and 42B) are forced into the terminal engagement grooves 49*a* and 49*b* in order. In this way, the cut end portions 4*c* and 4*d* of the excitation coil 4 can be electrically connected to the leads 41*a* and 41*b* of the temperature fuse 41. Therefore, the connection of the excitation coil 4 and the temperature fuse 41 can be carried out more easily than the prior art invention 2 without the necessity for soldering.

When the cut end portions 4*c* and 4*d* of the excitation coil 4 are forced into the coil grooves 51*a* of the terminals 42, the groove end of the groove 51*a* having an edge shape breaks through the insulating film of the excitation coil 4 and bites into the coil core wire. Therefore, the coil core wire and the terminal 42 can be electrically connected. In other words, the insulating film need not be removed and the connection work becomes easier. Since the fuse cover 43 covers the accommodation section 40, it is not necessary to mold the accommodation section 40 with synthetic resin, as in the prior art invention 3 and the temperature fuse 41 can be easily protected.

Because the terminal 42 is equipped integrally with the engagement pawl 52, it does not easily come off from the terminal engagement groove 49*a,* 49*b*.

The embodiment described above is an example of the application of the present invention to the solenoid clutch. However, the present invention can also be applied to a solenoid brake which allows the armature to be attracted directly and magnetically to the yoke, and can obtain similar effects.

The structures other than the structure for connecting the excitation coil 4, the diode 24 and the lead wire 26 on the power source side and the structure for connecting the excitation coil 4 to the temperature fuse 41 are not limited to the ones described above. As long as the electromagnetic coupling device has a structure wherein the yoke 2 is not fully fitted into the ring-like groove 7*a* of the rotor 7, the accommodation section 22 of the coil bobbin 20 may protrude from the outer peripheral surface of the yoke 2 and the lead-out direction of the lead wire 26 on the power source side may be any direction.

As has been explained above, the electromagnetic coupling device according to the present invention includes a coil bobbin disposed inside a ring-like groove of the yoke, for supporting an excitation coil, an accommodation section disposed integrally with this coil bobbin, for accommodating an electric component, and two terminals accommodated in this accommodation section, for electrically connecting the excitation coil and the electric component, wherein each terminal is U-shaped, grooves are made in the two, mutually facing side plate sections so that the end portions of the excitation coil and the leads of the electric component can be fitted into them, the coil engagement grooves into which the end portions of the excitation coil are fitted, the lead engagement grooves into which the leads of the electric component are fitted and the terminal engagement grooves into which the side plate sections of the terminals are fitted are made in the inner bottom surface of the accommodation section. Therefore, fusing and soldering that have been required in the past are not necessary, and the connection work of the excitation coil and the electric component can be carried out easily in a short time. Since the kind and number of terminals are small, the improvements in economy productivity and labor is made and the size of the accommodation section is reduced.

Because a varistor is used as the electric component and is connected in parallel with the excitation coil, the surge voltage developing when the supply of power to the excitation coil is absorbed and damage of the electric circuit can be prevented.

Because the temperature fuse or the heat-sensitive device is used as the electric component and is connected in series with the excitation coil, the supply of power to the excitation coil is cut off to separate the rotor from the armature when the rotary member on the output side does not rotate for some reason or other. Therefore, damage of the device due to heat generation or breakage of the V belt can be prevented.

Furthermore, since the engagement pawl is provided integrally to the terminal, come-off of the terminals from the terminal engagement grooves can be reliably prevented.

What is claimed is:

1. An electromagnetic coupling device including.

a coil bobbin (20) disposed in a ring-like groove (2*a*) of a yoke (2), for holding an excitation coil (4);

an accommodation section (22 or 40) formed integrally with said coiled bobbin (20), for accommodating an electric component (24 or 41); and two terminals (27 or 42) disposed in said accommodation section (22 or 40), for electrically connecting said excitation coil (4) and said electric component (24 or 41); wherein:

each of said terminals (27 or 42) is U-shaped;

grooves (34*a,* 34*b* or 51*a,* 51*b*) into which the end portions (4*a,* 4*b* or 4*c,* 4*d*) of said excitation coil (4) and the leads (24*a,* 24*b* or 41*a,* 41*b*) of said electric component (24 or 41) are fitted, respectively, are made in two side plate sections (27*b,* 27*c* or 42*b,* 42*c*) opposed to each other; and said accommodation section (22 or 40) includes:

coil lead-out holes (29*a,* 29*b* or 46*a,* 46*b*) through which the end portions (4*a,* 4*b* or 4*c,* 4*d*) of said excitation coil (4) are led out;

coil engagement grooves (30*a,* 30*b* or 47*a,* 47*b*) into which the end portions (4*a,* 4*b* or 4*c,* 4*d*) of said excitation coil (4) are fitted, lead engagement grooves (31*a,* 31*b* or 48*a,* 48*b*) with which the leads (24*a,* 24*b* or 41*a,* 41*b*) of said electric component (24 or 41) are engaged; and terminal engagement grooves (32*a,* 32*b* or 49*a,* 49*b*) into which the side plate sections (27*b,* 27*c* or 42*b,* 42*c*) of said terminal (27 or 42) are fitted, respectively.

2. An electromagnetic coupling device according to claim 1, wherein said electric component is a temperature fuse (41) and is connected in series with said excitation coil (4).

3. An electromagnetic coupling device according to claim 1, wherein said electric component is a heat-sensitive device (41) and is connected in series with said excitation coil (4).

4. An electromagnetic coupling device according to claim 1, wherein said electric component is a varistor (24) and is connected in parallel with said excitation coil (4), a lead wire (26) is connected to each terminal (27).

5. An electromagnetic coupling device comprising:

an excitation coil (4);

a bobbin main body (20A) to which said excitation coil (4) is fitted;

a first accommodation section (22) formed integrally with said bobbin main body (20A);

winding start and end portions (4*a,* 4*b*) of said excitation coil (4) led out from an inner bottom surface (22*e*) of said first accommodation section (22);

a first electric component (24) accommodated in said first accommodation section (22);

a pair of first terminals (27) accommodated in said first accommodation section (22), for connecting said winding start and end portions (4*a,* 4*b*) and leads (24*a,* 24*b*) of said first electric component (24);

a terminal cover (28) fixed to said first accommodation section (22);

a coil cover (20B) put on said excitation coil (4) protruding from said bobbin main body (20A);

a second accommodation section (40) provided integrally to said coil cover (20B);

cut end portions (4*c,* 4*d*) of said excitation coil (4) lead out from an inner bottom surface (40*e*) of said second accommodation section (40);

a second electric component (41) accommodated in said second accommodation section (40);

a pair of second terminals (42) accommodated in said second accommodation section (40), for connecting said cut end portions (4*c,* 4*d*) and leads (41*a,* 41*b*) of said second electric component (21);

a fuse cover (43) fixed to said second accommodation section (40); and a yoke (2) having at the bottom thereof a through-hole (21) into which said first accommodation section (22) is fitted, and a ring-like groove (2*a*) into which said bobbin main body (20A) and said coil cover (20B) are fitted.

6. An electromagnetic coupling device according to claim 5, wherein:

each of said terminals (27 or 42) is U-shaped;

grooves (34*a*, 34*b* or 51*a*, 51*b*) into which the end portions (4*a*, 4*b* or 4*c*, 4*d*) of said excitation coiled (4) and the leads (24*a*, 24*b* or 41*a*, 41*b*) of said electric component (24 or 41) are fitted are provided in two side plate sections (27*b*, 27*c* or 42*b*, 42*c*) opposed to each other; and each of said accommodation sections (22 or 40) is equipped with coil lead-out holes (29*a*, 29*b* or 46*a*, 46*b*) through which the end portions (4*a*, 4*b* or 4*c*, 4*d*) of said excitation coil (4) are led out, coil engagement grooves (30*a*, 30*b* or 47*a*, 47*b*) into which the end portions (4*a*, 4*b* or 4*c*, 4*d*) of said excitation coil (4) are fitted, lead engagement grooves (31*a*, 31*b* or 48*a*, 48*b*) into which the leads (24*a*, 24*b* or 41*a*, 41*b*) of said electric component (24 or 41) are fitted, and terminal engagement grooves (32*a*, 32*b* or 49*a*, 49*b*) into which the side plate sections (27*b*, 27*c* or 42*b*, 42*c*) of said terminal (27 or 42) are fitted.

7. An electromagnetic coupling device according to claim 5, wherein said second electric component is a temperature fuse (41) and is connected in series with said excitation coil (4).

8. An electromagnetic coupling device according to claim 5, wherein said second electric component is a heat-sensitive device (41) and is connected in series with said excitation coil (4).

9. An electromagnetic coupling device according to claim 5, wherein said first electric component is a varistor (24) and is connected in parallel with said excitation coil (4), and a lead wire (26) on the power source side is connected to said first terminal (27).

10. An electromagnetic coupling device according to claim 9, wherein said first terminal (27) comprises a wiring portion at which said two side plate sections (27*b*, 27*c*) for connecting said winding start and end portions (4*a*, 4*b*) the leads (24*a*, 24*b*) of said first electric component (24) are disposed, a clamp portion at which said two side plate sections (27*d*, 27*e*) for connecting said lead wires (26) on the power source side are disposed, and an engagement groove (27*f*) made between said wiring portion and said clamp portion, and said engagement groove (27*f*) is engaged with the side plate (22*c*) of said first accommodation section (22).

11. An electromagnetic coupling device comprising:

an excitation coil (4);

a bobbin main body (20A) to which said excitation coil (4) is fitted;

a first accommodation section (22) formed integrally with said bobbin main body (20A);

winding start and end portions (4*a*, 4*b*) of said excitation coil (4) led out from an inner bottom surface (22*e*) of said first accommodation section (22), and bent outward symmetrically;

a first electric component (24) accommodated in said first accommodation section (22), and having leads (24*a*, 24*b*) thereof disposed in parallel with said winding start and end portions (4*a*, 4*b*);

a pair of first terminals (27) accommodated in said first accommodation section (22), for connecting said winding start and end portions and said leads (24*a*, 24*b*) of said first electric component (24);

a terminal cover (28) fixed to said first accommodation section (22);

a coil cover (20B) put on said excitation coil (4) protruding from said bobbin main body (20A);

a second accommodation section (40) provided integrally to said coil cover (20B);

cut end portions (4*c*, 4*d*) of said excitation coil (4) led out from an inner bottom surface (40*e*) of said second accommodation section (40), and bent outward symmetrically;

a second electric component (41) accommodated in said second accommodation section (40), and having leads (41*a*, 41*b*) thereof disposed in parallel with said cut end portions (4*c*, 4*d*) of said excitation coil (4);

a pair of second terminal (42) accommodated in said second accommodation section (40), for connecting said cut end portions (4*c*, 4*d*) and said leads (41*a*, 41*b*) of said second electric component (41);

a fuse cover (43) fixed to said second accommodation section (40); and a yoke (2) having at the bottom thereof a through-hole (21) into which said accommodation section (22) is fitted, and a ring-like groove (2*a*) into which said bobbin main body (20A) and said coil cover (20B) are fitted.

12. An electromagnetic coupling device according to claim 11, wherein:

each of said terminals (27 or 42) is U-shaped;

grooves (34*a*, 34*b* or 51*a*, 51*b*) into which the end portions (4*a*, 4*b* or 4*c*, 4*d*) of said excitation coil (4) and the leads (24*a*, 24*b* or 41*a*, 41*b*) of said electric component (24 or 41) are fitted are provided in two side plate sections (27*b*, 27*c* or 42*b*, 42*c*) opposed to each other; and each of said accommodation sections (22 or 40) is provided with coil lead-out holes (29*a*, 29*b* or 46*a*, 46*b*) through which the end portions (4*a*, 4*b* or 4*c*, 4*d*) of said excitation coil (4) are lead out, coil engagement grooves (30*a*, 30*b* or 47*a*, 47*b*) into which the end portions (4*a*, 4*b* or 4*c*, 4*d*) of said excitation coil (4) are fitted.

lead engagement grooves (31*a*, 31*b* or 48*a*, 48*b*) into which the leads (24*a*, 24*b* or 41*a*, 41*b*) of said electric component (24 or 41) are fitted, and terminal engagement grooves (32*a*, 32*b* or 49*a*, 49*b*) into which the side plate sections (27*b*, 27*c* or 42*b*, 42*c*) of said terminal (27 or 42) are fitted, and which perpendicularly cross said coil engagement grooves (30*a*, 30*b* or 47*a*, 47*b*) and said lead engagement grooves (31*a*, 31*b* or 41*a*, 41*b*).

13. An electromagnetic coupling device according to claim 11, wherein said second electric component is a temperature fuse (41) and is connected in series with said excitation coil (4).

14. An electromagnetic coupling device according to claim 11, wherein said second electric component is a heat-sensitive device (41) and is connected in series with said excitation coil (4).

15. An electromagnetic coupling device according to claim 11, wherein said first electric component is a varistor (24) and is connected in parallel with said excitation coil (4), and the lead wire (26) on the power source side is connected to said first terminal (27).

16. An electromagnetic coupling device according to claim 15, wherein said first terminal (27) comprises a wiring portion at which said two side plate sections (27*b*, 27*c*) for connecting said winding start and end portions (4*a*, 4*b*) and the leads (24*a*, 24*b*) of said first electric component (24) are disposed, a clamp portion at which said two side plate sections (27*d*, 27*e*) for connecting said lead wires (26) on the power source side are disposed, and an engagement groove (27*f*) made between said wiring portion and said clamp portion, and said engagement groove (27*f*) is engaged with the side plate (22*c*) of said first accommodation section (22).

* * * * *